United States Patent
Chiu et al.

(10) Patent No.: US 6,385,170 B1
(45) Date of Patent: May 7, 2002

(54) METHOD AND SYSTEM FOR DYNAMICALLY TRIGGERING FLOW-BASED QUALITY OF SERVICE SHORTCUTS THROUGH A ROUTER

(75) Inventors: Angela L. Chiu, Tinton Falls; Xiaowen Mang, Manalapan, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/221,853

(22) Filed: Dec. 29, 1998

(51) Int. Cl.$^7$ ............................ G01R 31/08; H04L 12/28
(52) U.S. Cl. .................... 370/235; 370/351; 370/401
(58) Field of Search ................... 370/230, 231, 370/232, 233, 235, 252, 254, 401, 402, 412, 413, 466, 474, 351

(56) References Cited

U.S. PATENT DOCUMENTS 5,412,654 A * 5/1995 Perkins ..................... 370/94.1
6,009,077 A * 12/1999 Firoiu et al. ............... 370/230
6,252,857 B1 * 6/2001 Fendick et al. ............. 370/254

OTHER PUBLICATIONS

Cell Switch Router (CSR) –label switching router supporting standard ATM interfaces, Hiroshi Esaki, Shigeo Matsuzawa, Akiyoshi Mogi, Ken–ichi Ngami, Tatsuya Jimmei, Toru Kon'no, Yasuhiro Katsube, R&D Center, Toshiba Corporation, Japan, SPIE vol 3233, pp. 2 thru 10.*
Reducing Overhead in Flow–Switched Networks: An Empirical Study of Web Traffic, Anja Feldman Jennifer Rexford, Ramon Cacere –AT&T Labs –Research, Florham Park, NJ, 1988 IEEE, pp. 1205 thru 1213.*
Adaptive Resource Management for Flow–Based IP/ATM Hybrid Switching Systems* –Hao Che, San–qi Li, Department of Electrical and Computer Engineering, University of Texas at Austin, Austin, Texas, Arthur Lin, Cisco Systems, Inc., CA IEEE, pp. 381 thru 389.*
IP Switching –ATM Under IP, Peter Newman, Greg Minshall and Thomas L. Lyon, IEEE/ACM Transactions on Networking, vol. 6, No. 2, Apr. 1988, pp. 117 thru 129.*
An Architecture for Differntiated Services, S. Blake, D. Black, M. Carlson, E. Davies, Z. Wang, W. Weiss, Lucent Technologies, Dec. 1998, The Internet Society (1998) pp. 1 thru 33.*
Specification of the Controlled–Load Netowrk Element Serivce, J. Wrocklawski, MIT LCS, Sep. 1997, pp. 1 thru 17.*
Specification of Guaranteed Quality of Service, S. Shenker, C. Partridge, R. Guerin, Sep. 1997, pp. 1 thru 18.*

* cited by examiner

Primary Examiner—Alpus H. Hsu
Assistant Examiner—Duc Ho

(57) ABSTRACT

A method and system for dynamically triggering flow-based quality of service shortcuts through a router is disclosed. The method further includes the steps of receiving a data packet at a router, determining whether a shortcut has been set up for a data flow to which said packet belongs, checking the status of an onset trigger counter when no shortcut exists, and when a current value of said onset trigger exceeds an onset trigger value, setting up a new shortcut for said data packet belonging to said data flow. The method of the present invention includes a dynamic system for adjusting state variable to control the number of shortcuts in existence and the adjusting the shortcut set up rate for optimal router switching efficiency.

23 Claims, 7 Drawing Sheets

METHOD AND SYSTEM FOR DYNAMICALLY TRIGGERING FLOW-BASED QUALITY OF SERVICE SHORTCUTS THROUGH A ROUTER

TECHNICAL FIELD

This invention relates generally to processing data traffic and more particularly a technique for providing quality of service (QoS) for individual Internet Protocol (IP) data flows transferred via a router or other such suitable switch. The present invention describes a state dependent dynamic triggering scheme (SDDTS) for flow based QoS shortcuts.

BACKGROUND OFT THE INVENTION

The Internet has grown rapidly in the last several years. In order to support increasing demands for real-time and multimedia applications as well as mission critical applications, Internet Protocol (IP) need to support quality of service (QoS). QoS is a networking term that specifies a level of service based on, for example, throughput, delay, jitter and/or loss through a network. In general, QoS approaches can be divided into two main categories: flow-based and class-based. Flow-based QoS is designed to provide QoS assurance for each individual IP flow. IP specifies the format of data packets or datagrams and the addressing scheme to route the data packets or data grams to the desired destination in a network. An IP flow is defined as a set of packets matching a particular profile. A profile can be defined, for example, in terms of source/destination IP addresses, IP protocol, source/destination port numbers, and Type of Service (ToS) requirements. A typical example of flow based QoS is the Integrated Service model proposed by the Intserv working group of the Internet Engineering Taskforce (IETF). The QoS Integrated Service model is further discussed by J. Wroclawski in: "Specification of the Controlled-Load Network Element Service," in IETF RFC2211, September, 1997, incorporated herein by reference. S. Shenker, C. Partridge, and R. Guerin discuss another example of QoS in: "Specification of Guaranteed Quality of Service," in IETF RFC2212, September, 1997, incorporated herein by reference. The Integrated Service model provides fine granularity and flexibility in specifying flows. However, the service model requires storing states on a per-flow basis at each network node and an end-to-end signaling protocol such as Resource ReServation Protocol (RSVP). Using RSVP, an application must reserve resources along a route from source to destination. This procedure is problematic in that the reserved resources may be unavailable for additional processing needs and may result in decreased throughput. Further, RSVP raises concerns regarding the scalability of the approach due to the fact that the number of active flows can be quite large. In order to avoid the scalability problem with flow-based QoS, class-based QoS, which is also referred as Class of Service (CoS), is proposed to provide differentiated service for each class. For example, the Differentiated Service model is proposed by the Diffserv working group of IETF. The Differential Service Model is discussed by S. Blake, D. Black, M. Carlson, E. Davies, Z. Wang and W. Weiss in: "An Architecture for Differentiated Services," in IETF RFC2475, December, 1998, incorporated herein by reference. Generally, in a class-based QoS model, packets are marked as different classes and get served accordingly. Although class-based QoS may be more scalable, but it does not have the fine granularity of the flow-based approach. Thus there exists no assurance in class-based QoS for each individual flow within a class.

Since each approach has its own pros and cons, a network may need both models in order to provide adequate service for different types of applications. For example, class-based QoS may be enough for the majority of the Internet traffic that may not need fine granularity of service levels or require QoS assurance on a per-flow basis. Class-based QoS can be realized by preferential treatment for different classes of data traffic at each router in the network or by mapping different classes of data traffic onto different label switching paths (LSPs). LSPs may include, for example, Cisco Corporation's Tag switching paths, Multipoint-to-Point Tree (MPTs) IP switching paths in Ascend Corporation's IP Navigator and LSPs in MPLS (Multiprotocol Label Switching).

On the other hand, some mission critical applications may require tight control on packet loss and delay on each individual flow. In addition, some voice or video traffic may require minimum jitter which may cause degradation of the data signal for each individual flow. Class-based QoS may not be suitable for such applications, and thus flow-based QoS may be necessary for those types of applications. Flow-based QoS can be achieved by using explicit routes in MPLS, or with NHRP (Next Hop Resolution Protocol) shortcuts as proposed in MPOA (Multiprotocol Over ATM with Asynchronous Transfer Mode (ATM) underneath IP. MPOA enables ATM services to be integrated with existing local area networks (LANs) that use Ethernet, token ring or TCP/IP protocols. IP switching, as one of the key advances in IP technology, is designed to improve the performance and scalability of IP as well as providing QoS. Two of the main IP switching products, IP switch by Nokia, Corp. and Cell Switch Router by Toshiba, Corp., use flow-based shortcuts for long-lived flows and hop-by-hop routing for the rest of the traffic. A shortcut may be defined as a directed forwarding path associated with some label, for example, link layer address, such that data packets are efficiently routed without requiring the need for an IP routing table lookup at each hop.

In all those flow-based shortcut approaches, there is certain overhead associated with each shortcut setup. Since existing routers have limited resources in processing power and memory space, there are upper bounds on shortcut setup rates and number of simultaneous shortcut connections. Hence, it is important to investigate how to, most efficiently, trigger shortcut setup and tear down where the above physical limits are taken into account.

In previous work, researchers have studied the effect of the two triggering parameters, for example, onset trigger and abatement period, on the resource usage measured by average shortcut setup rate and average number of simultaneous shortcuts. Studies have concluded that a larger onset trigger may reduce both shortcut setup rate and number of simultaneous shortcuts, however, at the expense of forcing more packets to follow the default path. Further studies have indicated, that a larger abatement period may increase the number of simultaneous shortcuts, but decreases the shortcut setup rate.

Work in this area is limited. In particular, most of the prior art systems have focused on evaluating the performance of some static schemes. Generally, researchers have studied a static scheme where two parameters, the onset trigger and the timeout or some variations thereof, are used. Onset trigger may be defined as the number of packets that must be received, from the same flow, before triggering a shortcut to be setup. Timeout, also referred as the abatement period, is the preset idle time period before shortcut tearing down is triggered. The parameter setting is statically assigned based on some predefined IP traffic statistics. However, the static scheme does not take into account, for example, system resource limitations and/or the variability of network data traffic characteristics. To solve this problem an "Adaptive Resource Management for Flow-Based IP/ATM Hybrid Switching Systems," in IEEE INFOCOM, March 1998, by H. Che and S. Li, incorporated herein by reference, illustrates an adaptive flow identification/classification scheme for resource balancing in flow-based IP switching. The objective of the adaptive flow identification/classification scheme is to minimize the relative differences of utilization among the following three constrained resources: hop-by-hop routing, shortcut connection setup, and active shortcut connections. Based on the relative utilization order among the three resources, a learning algorithm is designed to adjust the probability of taking different actions, i.e., adjusting two control parameters in different directions. Simulation results have shown some advantages of this adaptive approach over the static one. However, due to its increased complexity, the practicality of the proposed adaptive scheme remains an open issue.

Moreover, none of the existing schemes or proposals addresses shortcut setup for QoS flows. Since each QoS flow requires certain level of service assurance, a shortcut that provides adequate service for each QoS flow through, for example, a router is required. As stated earlier, the traffic received by a router is generally quite dynamic and its characteristics are unknown in most cases. Thus a robust dynamic scheme for setting up and tearing down shortcuts, that can adjust itself to data traffic dynamics without being unnecessarily complex, is also required.

SUMMARY OF THE INVENTION

The present invention is directed to a State Dependent Dynamic Triggering Scheme (SDDTS) that addresses the above mentioned problems of the prior art. In particular the present invention illustrates a practical shortcut triggering scheme for QoS flows. The present invention illustrates a system and method for maximizing the percentage of QoS traffic switched through shortcuts given certain resource limitations, i.e., maximum shortcut setup rate and maximum number of simultaneous shortcut connections. Unlike prior art approaches, the present invention discloses a relatively uncomplicated and practical method based on arithmetic calculations to dynamically adjust two parameters, for example, onset trigger and abatement period. In embodiments of the present invention, the two parameters may be adjusted according to average shortcut setup rate and average number of simultaneous shortcut connections. Thus the present invention is fundamentally different from the "Adaptive Resource Management for Flow-Based IP/ATM Hybrid Switching Systems," approach, discussed earlier, that involves a more complex and unpractical optimization algorithm for probability estimation of actions where the objective is load balancing among three limited resources.

The present invention discloses a practical and robust dynamic scheme for efficiently creating and tearing down shortcuts for QoS data flows through, for example, a data router. One key aspect of such a scheme is to decide, for example, when to setup a shortcut and when to tear down a shortcut, which in turn is governed, for example, by the onset trigger and abatement period trigger values. The dynamic scheme, as disclosed in one embodiment of the present invention, updates those trigger values in an on-line manner so as to achieve a higher and consistent switching efficiency.

One object of the present invention, is to achieve near-optimal switching efficiency in terms of the percentage of bytes and packets that are routed over shortcuts. Because there is a direct relationship between number of shortcuts and the performance target, the more shortcuts, the better performance if there is no physical limit in terms of shortcuts. However, the number of shortcuts a router can support simultaneously does have its physical limits. In addition, a router may also have a limited set up rate, i.e. how fast a shortcut may be set up by the router.

Generally, when the number of simultaneous shortcuts hits its physical limit, a request for setting up a new shortcut must be queued and waits for some existing shortcuts to be torn down. Even though some existing shortcuts may not have any future traffic, they may still stay active until the end of the abatement period. While setup requests wait in the queue, the packets may be sent over the default route, reducing, for example, router efficiency. To avoid applying abatement criterion to the flows with requests queued, the unsatisfied requests are removed from the request queue at the end of each onset period. The flows may be subject to the onset trigger again. Thus there exists a natural bias towards flows with existing shortcuts over flows with unsatisfied requests, even where the existing shortcuts remain idle. Hence, the fewer the number of shortcut setup requests granted, the less the percentage of QoS traffic that is routed through shortcuts. Thus another objective of the present invention is to keep the average shortcut number close to its limit and at the same time to reduce the chances that shortcut number reaches its limit. Embodiments of the present invention, describe an upper threshold and a lower threshold level of the number of shortcuts, and denote the region between the two as the desired stable region. As a result, there is a better chance for future long-lived flows being routed through shortcuts. Thus, it is an object of the present invention to achieve a higher switching efficiency. Since a higher setup rate results in more shortcuts, the same design philosophy applies to the setup rate.

Thus, embodiments of the present invention disclose a dynamic scheme to adjust a plurality of control parameters to set-up and tear down shortcuts for most efficient routing of QoS flows in a network.

BRIEF DESCRIPTION OF THE DRAWINGS

The invention will be disclosed in detail herein with reference to the following figures in which like reference numbers refer to the elements, and wherein.

DETAILED DESCRIPTION OF THE PREFERRED EMBODIMENTS

Figure 1:
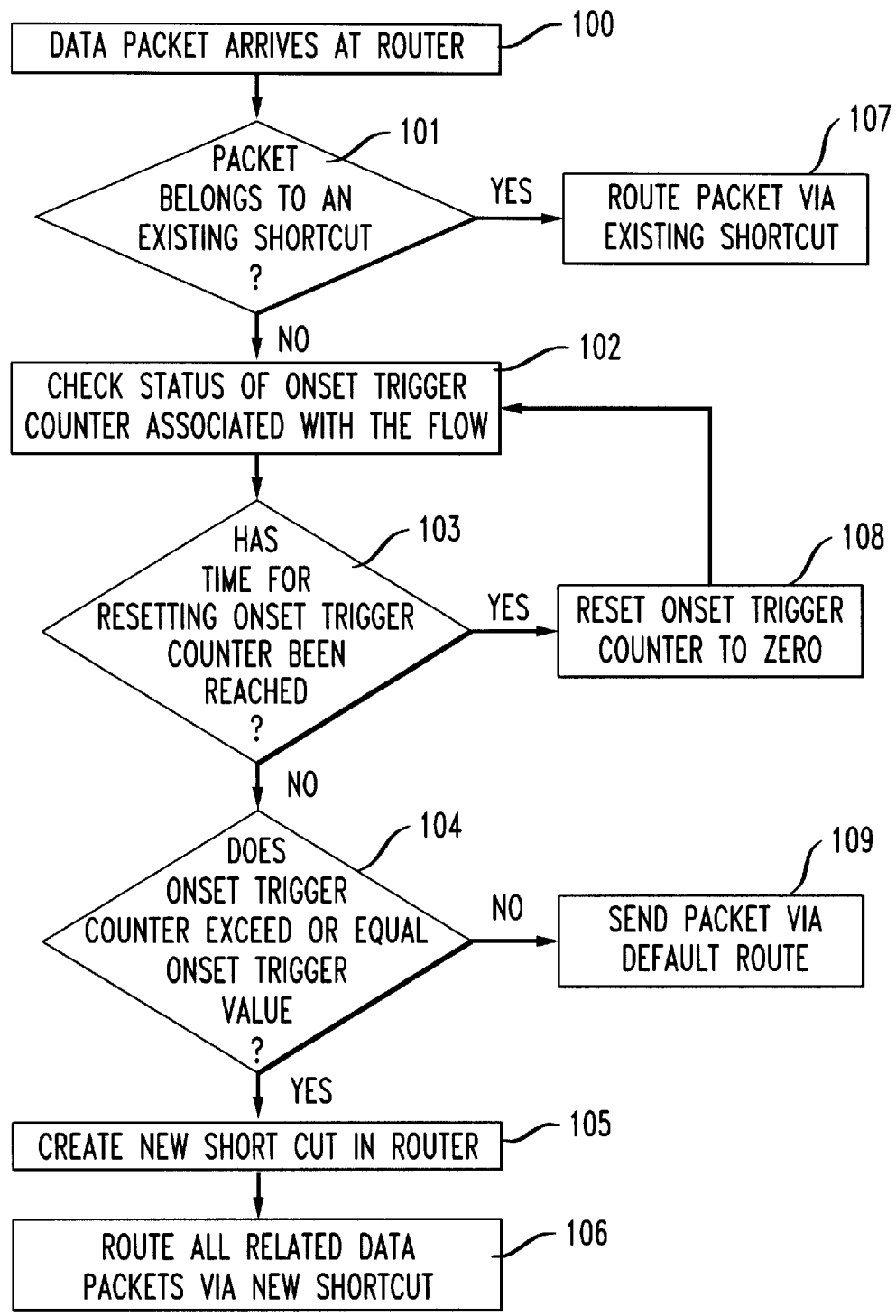
FIG. 1 is a flow diagram illustrating how new shortcuts may be created in accordance with an exemplary embodiment of the present invention.
Figure 1A:
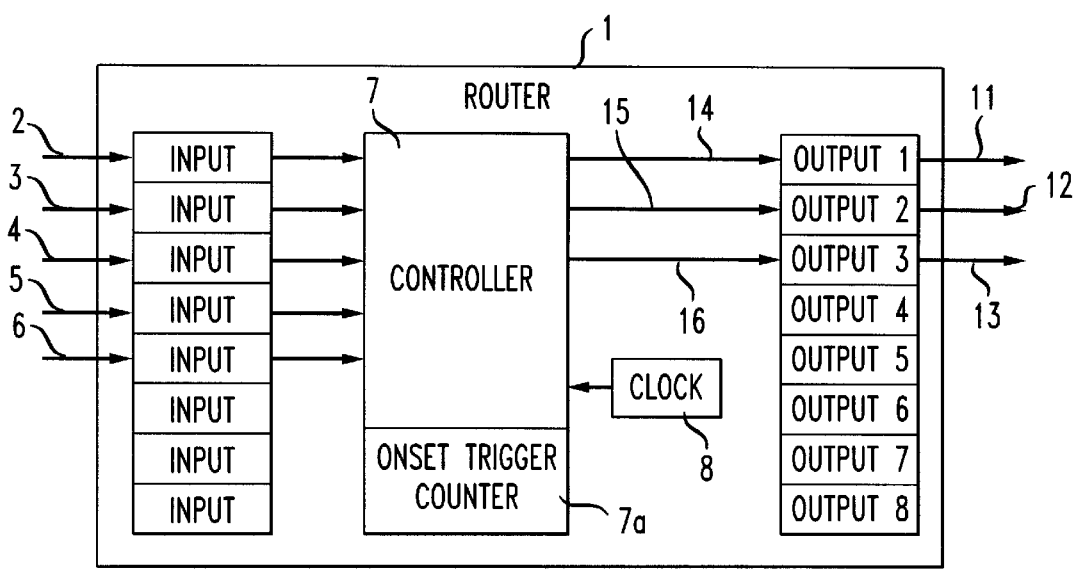
FIG. 1a is block diagram of a router in accordance with an exemplary embodiment of the present invention.

FIG. 1a illustrates a block diagram according to an exemplary embodiment of the present invention. A router 1 is shown with a plurality of inputs 2–6 to the router. These may be via plurality of ports located on the router or via a single port having the capability to multiplex a plurality of input signals into the router. The router may further comprise a controller 7 for various processing functions of the router, for example, monitoring the inputs, creating shortcuts, adjusting parameters, and any other such suitable functions that may be required by the router. The controller 7 may include, for example, an onset trigger counter 7a for counting the plurality of data packets of a flow received by the router, as will be discussed in more detail below. In addition the controller 7 may receive a timing signal from a clock 8 for controlling the various timing functions, including for example, monitoring the idle periods and/or abatement periods as described below in detail. The clock 8 may be a stratum 1 clock from an external timing source, or a stratum 2 clock or even an internal oscillator having a stratum 3 accuracy or any other such suitable timing source. The controller, based on the received input data packets and timing values, may determine, in accordance with embodiments of the present invention, that a new shortcut is required for routing a particular incoming data flow. If a new shortcut is required, the controller may create, for example, new shortcuts 14–15 for outputs 11–12. In embodiments of the present invention, the router may most efficiently route the data packets of a flow to the appropriate route via the shortcuts, without checking a lookup table for IP routing purposes which can decrease router efficiency. In addition, the router may determine that, for example, an existing shortcut 16 may have been idle longer than an abatement period and thus the controller may determine that the shortcut is no longer needed. In that case, the controller may tear down, for example, the existing shortcut 16. The various features of the present invention will be discussed and described in far greater details below.

FIG. 1 is a flow diagram illustrating a shortcut setup procedure in accordance with an exemplary embodiment of the present invention. In step 100, a data packet arrives at, for example, a router or other such suitable switch for routing data traffic. The router and/or switch may determine whether the data packet belongs to or is associated with a flow having an existing shortcut as shown in step 101. If the packet belongs to a flow having an existing shortcut, the data packet may be routed via the existing shortcut as shown in step 107. If, however, the data packet does not belong to an existing flow, then, for example, a controller may implement a process, in accordance with one embodiment of the present invention, to determine whether a new shortcut should be created. This process and/or program to determine whether a new shortcut should be created, may be a software program downloaded to the controller and/or may be stored in an EPROM or any such suitable device. As shown in step 102, the controller, for example, may check the status of an onset trigger counter associated with the flow. The onset trigger counter may keep count of data packets belonging to a particular flow and/or a set of packets matching a particular profile. Thus, in essence, the onset trigger counter may keep a running record of the number of packets of each flow that has visited the router. The trigger counter may keep a separate count for data packets having a similar profiles. As shown in step 103, the trigger counter, may include a clock for determining whether the time, known as the onset period, for resetting the onset trigger to zero been reached. If, for example, the number of data packets received, of a particular flow, does not equal at least the number of packets as specified by the onset trigger value, received during a period of time that is equal to the onset period, then the trigger counter for that flow may be reset to zero as shown in step 108. This onset period may be based, for example, on a predetermined value or may be alternatively determined by any suitable technique known in the art. If the onset trigger counter is reset to zero, as shown in step 108, then this information may be provided back to the controller so that counting may restart as packets related to that flow are again received by the router or switch. On the other hand, if data packets fitting a particular profile are constantly being received at the router, such that the time for resetting the onset period has not been reached, then there may be no need to reset the trigger counter. Thus, as the counter accumulates counts for the current flow profile, the controller may determine whether the onset trigger counter exceed or equal an onset trigger value as shown in step 104. The onset trigger value may be determined dynamically, in accordance with the present invention, based on, for example, resource availability and/or data traffic flow through the router and/or network. If the trigger counter for the particular flow profile does not exceed or equal, for example, the dynamically determined onset trigger value, then the data packet may be sent to a default route as shown in step 109. However, if the trigger counter for the particular flow profile does exceed or is equal to, for example, the dynamically determined onset trigger value, then a new shortcut may be created within the router as shown in step 105. Once the new shortcut is created, all data packets matching the particular flow profile may be routed via the newly created shortcut as shown in step 106.

Figure 2:
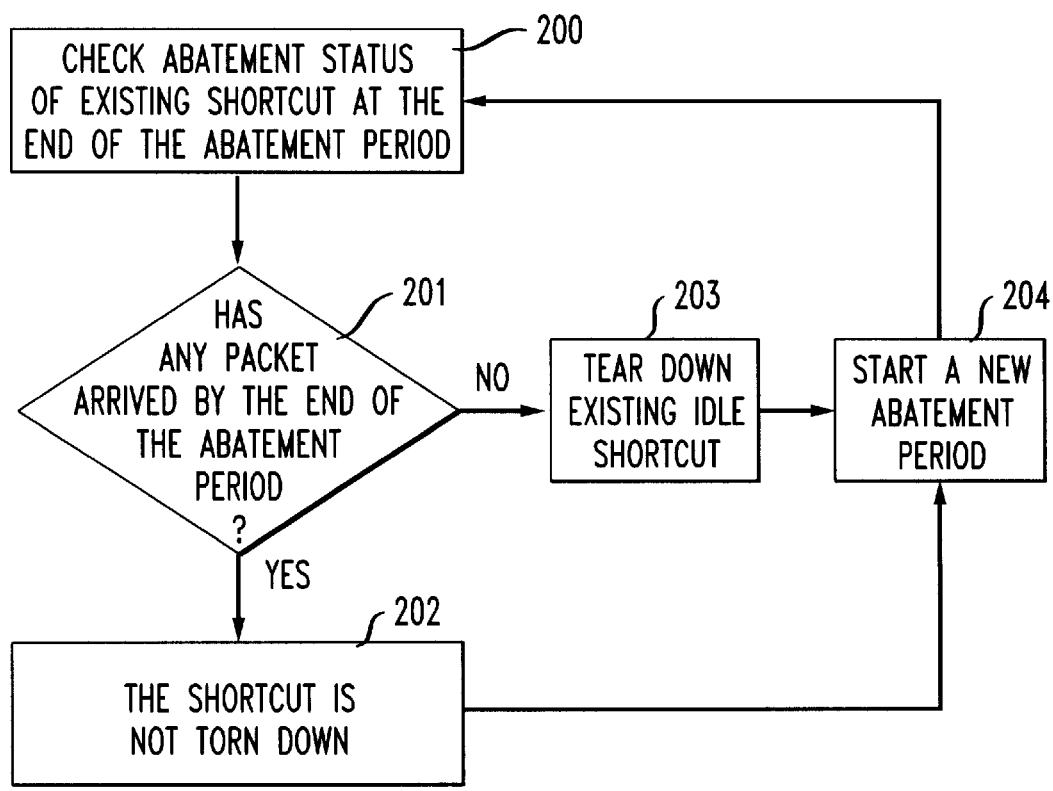
FIG. 2 is a flow chart illustrating how existing shortcuts may be torn down in accordance with an exemplary embodiment of the present invention.

Under embodiments of the present invention, for routing QoS flows efficiently, new shortcuts may be created dynamically as existing idle shortcuts may be torn down. Thus, effectively tearing down an idle shortcut at the appropriate time may permit the creation of new functional shortcuts permitting the router to achieve higher and consistent switching efficiencies while staying within its physical limitations. FIG. 2 illustrates the tearing down of the existing shortcuts in accordance with an embodiment of the present invention. An existing shortcut may be torn down if it is determined that there are no data packet arrivals fitting the profile of those flows with active shortcuts for a given period of time. As shown in step 200, the controller may check the abatement status at the end of each abatement period whose length is equal to the value of the parameter of the abatement period. The abatement status may be determined based on the arrival of any packets that belongs to the flow by the end of the current abatement period as shown in step 201. The abatement period, for tearing down an existing shortcut, may also be a dynamically determined period of time. The abatement period may be determined dynamically, in accordance with the present invention, based on, for example, resource availability and/or data traffic flow through the router or network. An idle shortcut may be defined as a shortcut that has been in existence, without receiving a data packet of the flow for which the shortcut was created, by the end of the abatement period. Where such an idle shortcut is determined to exist, such shortcut may be torn down as shown in step 203. At the end of an abatement period, the router may start a new abatement period as shown in step 204. Accordingly, the abatement period may be updated at the end of the previous abatement period and/or may be updated periodically. The new abatement period may also be dynamically determined based on, for example, varying traffic conditions and/or available system resources. Where traffic conditions require, the abatement period may become smaller and smaller causing shortcuts to be torn down sooner. Accordingly, new shortcuts may be created, under embodiments of the present invention, as idle shortcuts are torn down. If, however, the shortcut continuously receives data packets of the particular flow profile for which the shortcut was created, the shortcut will not be torn down and will continue to route the appropriate data packets. Thus, as long as the time period between data packets of the same flow, received by the router, does not exceed the abatement period, the shortcut may remain in existence as shown in step 202.

As discussed above, the onset trigger may control the process of setting up a new shortcut based on for example, the onset period. Meanwhile the abatement period may govern the process of tearing down, for example, an existing idle shortcut. The present invention discloses a system and method for determining and adjusting control parameters to regulate two state variables, for example, the number of simultaneous shortcuts and shortcut setup rate, for efficient traffic flow in a router or any other such suitable switch. Thus, embodiments of the present invention, may permit the automatic tuning of control parameters based on data traffic conditions and system limitations and/or available resources. The state dependent dynamic triggering scheme (SDDTS) is further described below in detail.

The SDDTS technique may be based on regulating a plurality of control parameters, for example, the onset trigger and abatement period or any other such parameter that may impact the two state variables. As stated above, the two state variables that may have the maximum impact on the switch efficiencies comprise number of simultaneous shortcuts and shortcut setup rate. Thus, to achieve near-optimal switching efficiency based on at least these two state variables, the control parameter settings may vary based on the incoming traffic characteristics and system resource limitations. One embodiment of the present invention based on the SDDTS technique may utilize, for example, a dual threshold technique for the various control parameters. Thus, each of the control parameters may have an upper threshold and a lower threshold. Since the data traffic characteristics of, for example, a router or any other such switch, may be unknown and constantly changing, it is impossible to find an optimal predetermined set of control parameters. For example, it would impossible to find a single onset trigger value and/or abatement period that suits all data traffic patterns for a desirable switching efficiency. In embodiments of the present invention, the performance of a router or other switching device, may be kept at satisfactory levels by defining an upper threshold limit and a lower threshold limit for the desired parameters. Accordingly, by maintaining the parameters between the desired threshold values, may keep the state variables, for example, the number of simultaneous shortcuts and shortcut setup rate within the desired stable state region for optimal switch efficiency. Having upper and lower threshold limits of the control parameters may permit a certain degree of fluctuation within the stable state region for adjusting to the constantly changing incoming traffic data patterns. The criteria to determine performance of, for example, the router or other such switching equipment, may be measured in terms of percentage of bytes and/or percentage of packets on shortcuts. Thus, the more data being routed via shortcuts, may ultimately results in less data packets being routed to default routes that may decrease the overall efficiency of the switch as well as possible performance degradation for the QoS flows.

In embodiments of the present invention, utilizing the SDDTS technique, the state variables described above may be monitored to trigger the adjustment control parameters. Thus, the status of, for example, the average shortcut number and average setup rates may be checked periodically. If the average shortcut number and average setup rates are within stable state region, no action needs to be taken. If, however, the state variables are not within the stable state region, then, for example, the onset trigger value and/or abatement period may be updated so as to move the state variables towards the stable state region.

A suitable exponential smoothing technique may be utilized to calculate, for example, the average shortcut number and the average setup rates. Exponential smoothing may be utilized to avoid excessive oscillations resulting from over reacting to the system's instantaneous fluctuation. For example, exponential smoothing may prevent the system from unnecessarily adjusting system parameters, where the system experiences only temporary increases in, for example, in the number of shortcuts and/or setup rates resulting from temporary fluctuations in data traffic patterns. Without utilizing some averaging method, the system may overreact to these temporary changes of incoming traffic patterns. Thus, as long as the average values stay within the stable state the system may permit certain instances where the actual values of the state variables exceed their thresholds, either higher than the upper threshold or lower than the lower threshold.

The following is a list of parameters used in the algorithm in accordance with embodiments of the present invention described below.

A first set of parameters may include the physical limits of the system which may be given as:

Limit(shortcut): the shortcut number limit; and

Limit(setup): the setup rate limit in number of shortcuts per second.

A second set of parameters includes the two, above mentioned, instantaneous measurements of the state variables and their calculated average values:

N(shortcut: the number of shortcuts;

S(setup) : the desirable setup rate in number of shortcuts per second, (which may be the reciprocal of the duration between the last two consecutive setup requests);

$N(shortcut)_{avg}$: the average shortcut numbers; and

S(setup)hd avg: the average setup rate.

A third set of parameters may include the upper and lower thresholds of the two state variables preset, for example, at the lower and upper thresholds of 60% and 80% of their physical limits respectively:

$Thr(shortcut)^{lower}$: the lower threshold for shortcut numbers;

$Thr(shortcut)^{upper}$: the upper threshold for shortcut numbers;

$Thr(setup)^{lower}$: the lower threshold for the setup rate; and $Thr(setup)^{upper}$: the upper threshold for the setup rate.

A fourth set of parameters may include the increment/decrement unit on the two triggering parameters preset at some reasonable values, for example, 5 packets for onset trigger and 10 seconds for abatement period:

G(onset): the update granularity for Onset Trigger; and

G(abatement): the update granularity for Abatement Period.

A fifth and final set of parameters are the upper and lower limits on the two triggering parameters that may be chosen according to different applications:

Max(onset): maximum value of Onset Trigger;

Min(onset): minimum value of Onset Trigger;

Max(abatement): maximum value of Abatement Period; and

Min(abatement): minimum value of Abatement Period.

As described above, exponential smoothing may prevent the system from unnecessarily adjusting system parameters, where the system experiences only a temporary increase in, for example, in the number of shortcuts and/or setup rates resulting from sudden changes in data traffic patterns. The average state variables may be obtained using the exponential smoothing technique as follows:

$N(shortcut)_{avg} \leftarrow (1-\alpha)*N(shortcut)_{avg}+\alpha*N(shortcut)$ $1S(setup)_{avg} \leftarrow (1-\alpha)*(1/S(setup)_{avg})+\alpha*(1/S(setup))$ The value of $\alpha$ may be a (negative) power of two, i.e., $2^{-n}$, n=0, 1, 2 . . . $N(shortcut)_{avg}$ may be updated every Update_Period, a pre-determined parameter in seconds, while $S(setup)_{avg}$ may be updated whenever there is a new setup request (i.e., a new flow meets or exceeds its respective onset trigger value).

Figure 3:
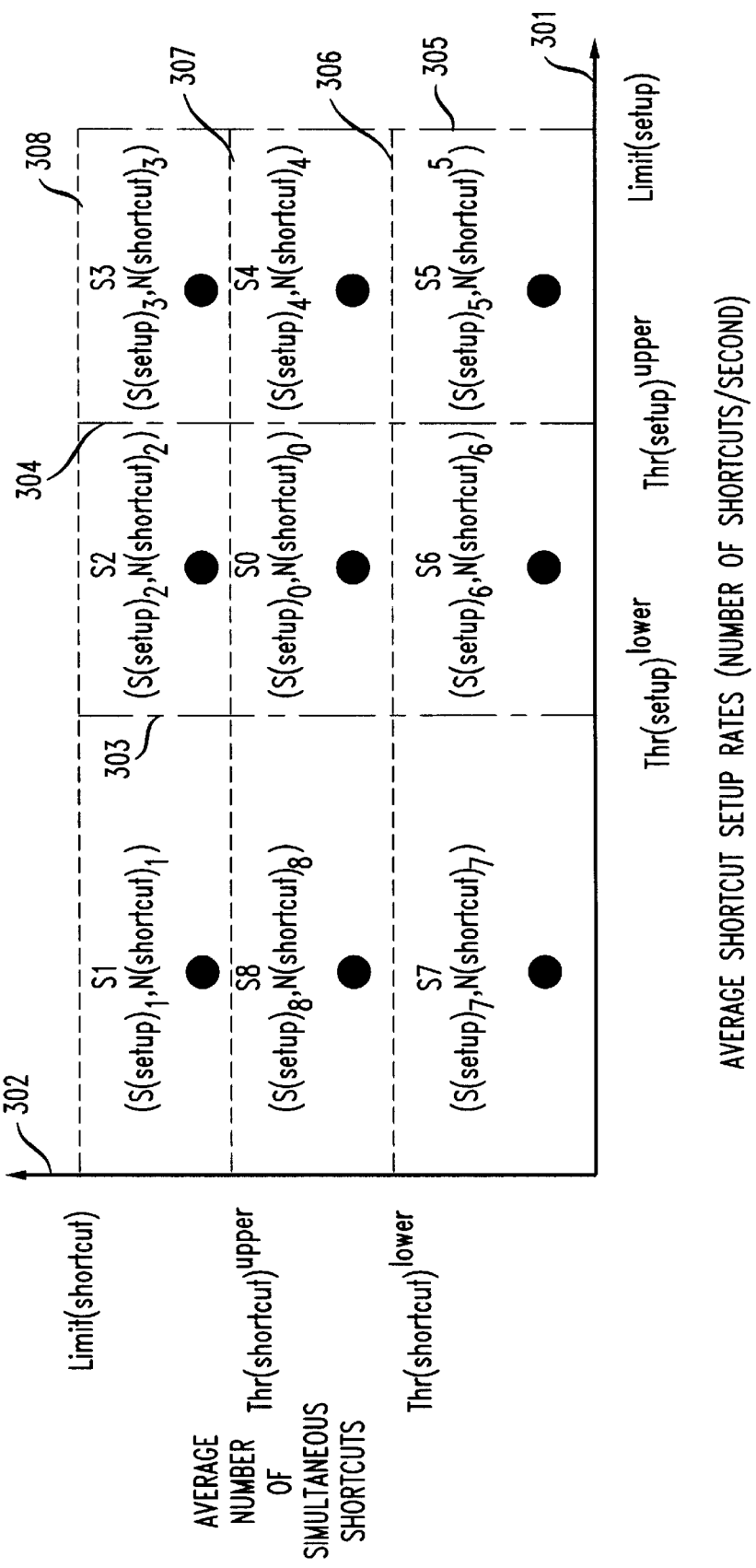
FIG. 3 is an graph illustrating possible states of the two state variables in embodiments of the present invention.

FIG. 3 illustrates a graph representing nine (9) states indicating the various possibilities of the two state variables, for example, the average number of simultaneous shortcuts and the average shortcut setup rate. As illustrated, in FIG. 3, the X-axis 301 may represent the Average Shortcut Setup Rate (as number of shortcuts per second) and the Y-axis 302 may represent the Average Number of Simultaneous Shortcuts. On the X axis 301, vertical line 303 may represent the $Thr(setup)^{lower}$ and vertical line 304 may represent the $Thr(setup)^{upper}$. The setup rate limit Limit(setup), in number of shortcuts per second, may be represented with vertical line 305 as shown in FIG. 3. On the Y-axis 302, horizontal line 306 may represent the $Thr(shortcut)^{lower}$ and horizontal line 307 may represent the $Thr(shortcut)^{upper}$. The shortcut limit Limit(shortcut) may be represented with horizontal line 308. As illustrated in FIG. 3, the horizontal and vertical lines may define 9 separate regions or states labeled as S0, S1, S2, S3, S4, S5, S6, S7, and S8, where S0 may de defined as the stable state region. Values in these regions may be labeled as $(S(setup)_w, N(shortcut)_w)$, where w may be 0–8 to represent the regions S0–S8 respectively. Thus, for example, $(S(setup)_3, N(shortcut)_3)$ may indicate the value of the two state variables in the S3 region. All other values of the two state variables may be represented similarly.

As listed above, the number of average simultaneous shortcuts may be represented by the N(shortcut)avg and the average shortcut setup rate may be represented by $S(setup)_{avg}$. The values of $S(setup)_{avg}$ and $N(shortcut)_{avg}$ may be referred to as the controlled state. The controlled state values, $(S(setup)_{avg}, N(shortcut)_{avg})$, may be located on the graph in any of the locations S0, S1, S2, S3, S4, S5, S6, S7, or S8, depending on their respective X and Y values and accordingly represented as $(S(setup)_w, N(shortcut)_w)$, where w may be 0–8 to represent the states S0–S8 respectively. As stated above, state or region S0 may be defined as the desired stable state region. For the controlled state values $(S(setup)_{avg}, N(shortcut)_{avg})$ that are, for example, outside the stable state region S0, the values of the onset trigger or/and abatement period may be updated so as to move the controlled state values towards the stable state region S0.

In the first example, if the average value of the two state variables $(S(setup)_{avg}, N(shortcut)_{avg})$ is in region S1, it may be labeled as $(S(setup)l, N(shortcut)_1)$. As shown in FIG. 3, in order to bring the value $(S(setup)_1, N(shortcut)_1)$ in State S1, for example, into the stable region S0, it may be necessary to update the onset trigger or/and abatement period parameters in a way such that the number of shortcuts is reduced and the setup rate is accelerated. Thus, decreasing the number of shortcuts, would bring the value of $N(shortcut)_1$ below the $Thr(shortcut)^{upper}$ line 307 on the Y-axis 302. While increasing the Setup Rate, would bring the value of $S(setup)_1$ to the right of $Thr(setup)^{lower}$ line 303 on the X-axis 301. Since updating onset trigger may actually have a reverse effect on either the number of shortcuts or the setup rate than the desired effect, it may be necessary to alternatively adjust the abatement period accordingly, by decreasing its value. Accordingly, the following control actions may be taken to bring the value of $(S(setup)_1, N(shortcut)_1)$ from state S1 to S0:

Abatement_Period=max{Abatement_PeriodG (abatement), Min(abatement)}.

Accordingly, for the value of $(S(setup)_2, N(shortcut)_2)$ in State S2, it may only be necessary to decrease the value of $N(shortcut)_2$ below the $Thr(shortcut)_{upper}$ line 307 on the Y axis 302 in order to move into the state S0. Thus, it may only be necessary to decrease the number of shortcuts to bring $(S(setup)_2, N(shortcut)_2)$ value from state S2 to the desired stable state, S0. By performing the following control actions, in accordance with embodiments of the present invention, the two state variables $(S(setup)_2, N(shortcut)_2)$ may be brought within the desired stable:

Onset_Trigger=min{(Onset_(Trigger+G(onset), Max(onset)}

Abatement_Period=max{(Abatement_Period−G (abatement), Min(abatement)}

From state S3, to bring the value $(S(setup)_3, N(shortcut)_3)$ into the stable region S0, it may be necessary to update the onset trigger and/or abatement period parameters in a way such that the number of shortcuts is reduced and he setup rate is also decreased. Thus, decreasing the number of shortcuts, would bring the value of $N(shortcut)_3$ below the $Thr(shortcut)^{upper}$ line 307 on the Y-axis 302. At the same time, decreasing the setup rate, would also bring the value of $S(setup)_3$ to the left of $Thr(setup)^{upper}$ line 304 on the X-axis 301. Thus, in this case, it may only be necessary to increase the onset trigger so as to decrease the shortcut setup rate and to decrease the number of active shortcuts. In this case the abatement period may not need to be adjusted. Thus, the following control actions may be taken to bring the value of $(S(setup)_3, N(shortcut)_3)$ from state S3 to S0:

Onset_Trigger=min{Onset_Trigger+G(onset), Max(onset)}

In state S4, to bring the value $(S(setup)_4, N(shortcut)_4)$ into the stable region S0, it may only be necessary to decrease the value of $S(setup)_4$ to the left of the $Thr(setup)^{upper}$ line 304 on the X axis 301 in order to move into the state S0. Thus, it may be necessary to increase the onset trigger and increase the abatement period, to decrease the setup rate while maintaining the number of existing shortcuts. The value of $(S(setup)_4, N(shortcut)_4)$ from state S4 to the desired stable state S0, may be achieved by performing the following control actions:

Onset_Trigger=min{Onset_Trigger+G(onset), Max(onset)}

Abatement_Period=min{Abatement_Period+G (abatement), Max(abatement)}

Continuing on FIG. 3, in order to bring the value $(S(setup)_5, N(shortcut)_5)$ in state S5, for example, into the stable region S0, it may be necessary to increase the number of shortcuts and reduce the setup rate. Thus, decreasing the number of shortcuts, would bring the value of $N(shortcut)_5$ above the $Thr(shortcut)_{lower}$ line 306 on the Y axis 302. While decreasing the setup rate, would bring the value of $S(setup)_5$ to the left of $Thr(setup)^{upper}$ line 304 on the X-axis 301. Since updating onset trigger may actually have a reverse effect on either the number of shortcuts or the setup rate than the desired effect, it may be necessary to alternatively adjust the abatement period accordingly, by increasing its value. Accordingly, the following control actions may be taken to bring the value of $(S(setup)_5, N(shortcut)_5)$ from state S5 to S0:

Abatement_Period=min{Abatement_Period+G(abatement, Max(abatement)}.

Thus, for the value of $(S(setup)_6, N(shortcut)_6)$ in State S6, it may only be necessary to increase the value of $N(shortcut)_6$ above the $Thr(shortcut)^{upper}$ line 306 on the Y axis in order to move into the state S0. Thus, it may only be necessary to increase the number of shortcuts to bring $(S(setup)_6, N(shortcut)_6)$ value from state S6 to the desired stable state, S0. By performing the following control actions, in accordance with the present invention, the two state variables $(S(setup)_6, N(shortcut)_6)$ may be brought within the desired stable state S0:

Onset_Trigger=max{Onset_Trigger−G(onset), Min(onset)}

Abatement_Period=min{Abatement_Period+G(abatement), Max(abatement)}

For state S7, to bring the value $(S(setup)_7, N(shortcut)_7)$ into the stable region S0, it may also be necessary to update the Onset Trigger or/and Abatement Period parameters in a way such that the number of shortcuts is increased and the setup rate is also increased. Thus, increasing the number of shortcuts, would bring the value of $N(shortcut)_7$ above the $Thr(shortcut)^{lower}$ line 306 on the Y axis 302. At the same time, increasing the setup rate, would bring the value of $S(setup)_7$ to the right of $Thr(setup)^{lower}$ line 303 on the X axis 301. Thus, in this case, it may only be necessary to decrease the onset trigger so as to increase the shortcut setup rates and the number of simultaneous shortcuts. In this case the abatement period may not need to be adjusted. Thus, the following control actions may be taken to bring the value of $(S(setup)_7, N(shortcut)_7)$ from state S7 to S0:

Onset_Trigger=min{(Onset_Trigger−G(onset), Min(onset)}

Finally, for the value of $(S(setup)_8, N(shortcut)_8)$ in State S8, it may only be necessary to increase the value of $S(setup)_8$ to the right of the $Thr(setup)^{lower}$ line 303 on the X axis 301 in order to move into the state S0. Thus, it may only be necessary to increase the setup rate to bring $(S(setup)_8, N(shortcut)_8)$ value from state S8 to the desired stable state, S0. By performing the following control actions, in accordance with the present invention, the two state variables $(S(setup)_8, N(shortcut)_8)$ may be brought within the desired stable:

Onset_Trigger=max {Onset_Trigger−G(onset), Min(onset)}

Abatement_Period=max{Abatement_Period−G(abatement), Min(abatement)}

Therefore, the examples for the various states, illustrates how the average shortcut set up rate $S(setup)_{avg}$ and the average number of simultaneous shortcuts $N(shortcut)_{avg}$ can be brought within the stable state S0 while remaining within the physical limits of the system. As explained above and shown in FIG. 3, the physical limits of the system are represented by Limit(setup) and Limit(shortcut).

Table 3.1 below, which relates to FIG. 3, summarizes, as discussed above, the increment/decrement units on the two triggering parameters that may be preset at some reasonable values, for example, 5 packets for onset trigger and 10 seconds for abatement period. As stated above G(onset) may represent the update granularity for onset trigger while the G(abatement) represents the update granularity for the abatement period. Thus, as discussed above, adjusting the parameters may permit the two state variables, for example, the number of simultaneous shortcuts and the shortcut setup rate to be adjusted within the stable state.

TABLE 3.1

Illustration of the Parameter Updating at the Eight States

| State | Change of Onset_Trigger | Change of Abatement_Period |
|---|---|---|
| S1 | 0 | − G(abatement) |
| S2 | + G(onset) | − G(abatement) |
| S3 | + G(onset) | 0 |
| S4 | + G(onset) | + G(abatement) |
| S5 | 0 | + G(abatement) |
| S6 | − G(onset) | + G(abatement) |
| S7 | − G(onset) | 0 |
| S8 | − G(onset) | − G(abatement) |

It should be noted that while updated onset trigger may be effective immediately upon adjustment; however, the updated abatement period may not be effective until the end of the current abatement period.

FIGS. 4–10 illustrate simulations, in accordance with exemplary embodiments of the present invention. It is to be noted that the present invention may include several variations that are within the scope of the invention. The simulation results indicate the robustness and advantage of SDDTS in varying data traffic conditions and for a variety of different control parameters. Some simulation graphs may compare the results of the dynamic system, under embodiments of the present invention, with prior art static systems.

Although the packet traces utilized in the simulations were collected from a business LAN segment, it should be noted that the present invention may be implemented in all types of computer data networks, including wide area networks (WAN), ATM, Frame relay networks and or other such suitable networks utilizing routers or other such switches. For simulation purposes, all local and other types of traffic was filtered out and thus only transit TCP traffic was present. The total trace length is approximately 9 hours but segmented into 7 shorter traces. A flow is identified by its IP source and destination addresses plus its TCP port numbers. The number of flows contained in the above-mentioned 7 traffic traces (trace 0 to 6) range from 22000 to 36000 flows.

FIGS. 4–10 illustrate 7 business traffic traces comparing the performance of SDDTS, under embodiments of the present invention, to that of the static scheme in terms of percentage of packets/bytes carried on shortcuts. As stated earlier, the greater the amount of QoS traffic routed via shortcuts, the greater the efficiency of the router.

For the purposes of the simulation, describing an exemplary embodiment of the present invention, the upper and lower bounds of the onset trigger and abatement period may be, for example, set as follows:

Min(onset)=5 and Max(onset)=20,

Min(abatement)=10 and Max(abatement)=60.

The values selected for the onset rigger and abatement period may be selected to be any suitable values.

For simulation purposes the onset period is may be preset to be 30 seconds. The increments/decrements for both triggering parameters may be set, for example, as G(onset)=5 packets and G(abatement)=10 seconds. The upper and lower thresholds used in SDDTS may be chosen as follows, $Thr(shortcut)^{lower}$=0.6*L(shortcut), $Thr(shortcut)^{upper}$=0.8*L(shortcut), $Thr(setup)^{lower}$=0.6*L(setup), $Thr(setup)^{upper}$=0.8*L(setup).

Thus, the upper threshold value for the number of shortcuts may be set at 80% of the physical upper limit of, for example, a router or any other such suitable switch. The lower threshold value for the number of shortcuts may be set at 60% of the lower limit of such equipment. Similarly, the upper threshold value for the setup rate may be set at 80% of the possible upper limit of the setup rate. The lower threshold value for the setup rate may be set at 60% of the lower limit of the setup rate.

It should be noted that the above parameters are selected for simulation purposes and in practice, those parameters may be set according to the application and/or the desired quality of service. Further, the above description is of an exemplary embodiment, and that the description covers to any and all variation within the scope of the present invention.

The damping factor α and the Update_Period may be set at 0.125 and 1 respectively. Performance of the dynamic SDDTS and the static scheme may be compared based on a variety of initial settings for the two parameters, for example, onset trigger and abatement period. The following 24 scenarios may be defined as having the following initial conditions. The Onset_Trigger value may be represented by i and Abatement_Period may be represented by j. Thus, the Initial(i, j) represents the initial Onset_Trigger=i and Abatement_Period=j as follows:

Scenario 1 to 6: Initial(5,j),j=10, 20, 30, 40, 50, and 60 respectively.

Scenario 7 to 12: Initial(10,j),j=10, 20, 30, 40, 50, and 60 respectively.

Scenario 13 to 18: Initial(15, j),j=10, 20, 30, 40, 50, and 60 respectively.

Scenario 19 to 24: Initial(20,j),j=10, 20, 30, 40, 50, and 60 respectively.

Figure 4:
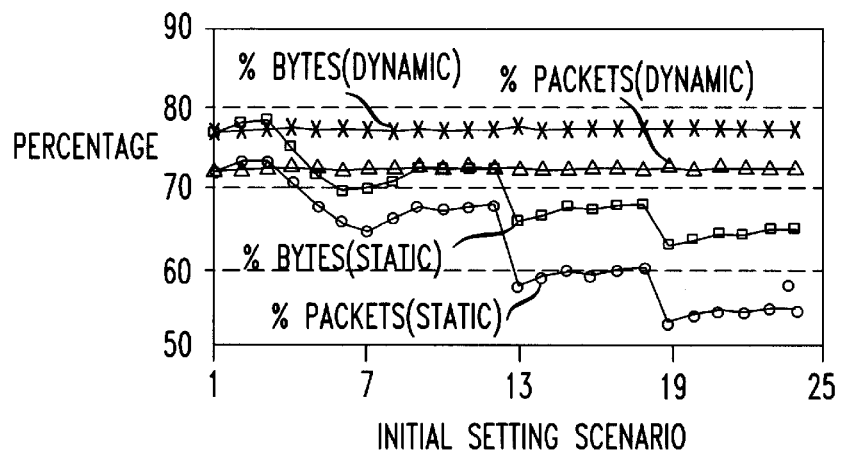
FIGS. 4–10 illustrate simulation results of embodiments of the present invention.
Figure 5:
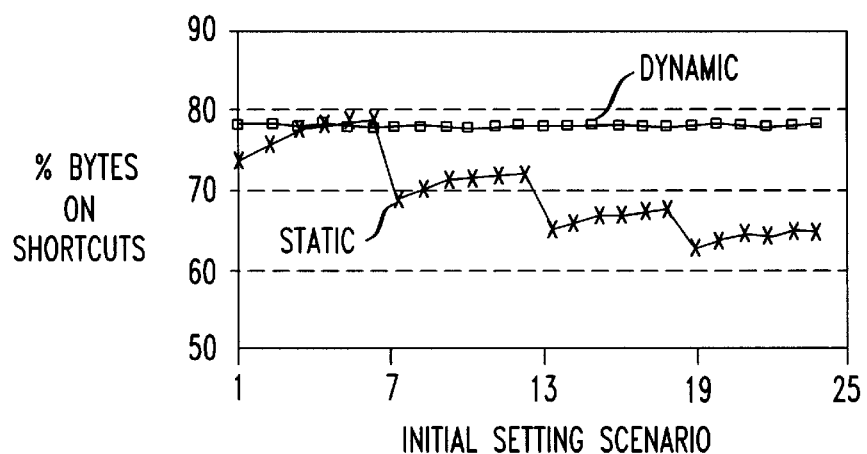
Figure 6:
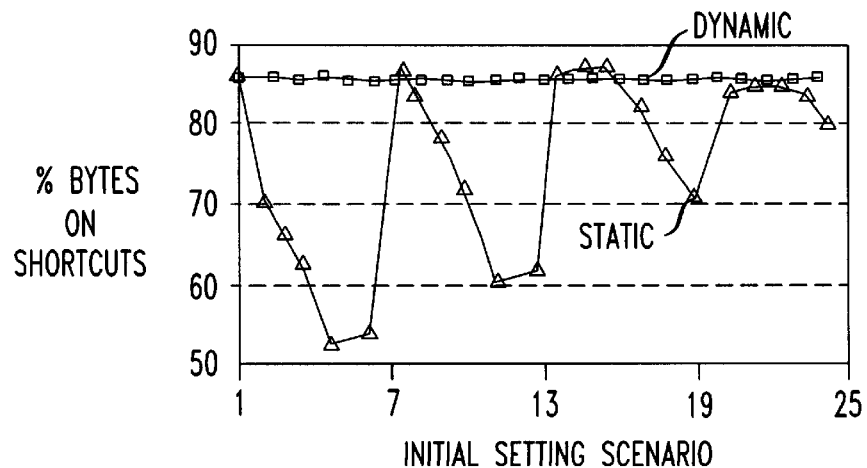

For FIGS. 4–6 below, the horizontal axis represents the various settings of the initial conditions of the Onset_Trigger and Abatement_Period described above. While the vertical axis represents of packets and/or packets what are routed via shortcuts. Thus, FIGS. 4–10 illustrate the percentage of data that may be routed via shortcuts as traffic conditions and/or system parameters are varied. As stated earlier, the different traces represent the varying traffic conditions. Trace 0 may be used with, for example, the maximum number of shortcuts, L(shortcut), being 150, and the maximum setup rate, L(setup), being 20 shortcuts per second. These two parameters may be denoted as Limit(150, 20).

FIG. 4 illustrates the percentages of packets/bytes on shortcuts for both the static scheme and SDDTS based on the parameters, Limit(150,20) and Trace 0. FIG. 4, illustrating an exemplary embodiment of the present invention, demonstrates near-optimal performance of SDDTS, independent of initial parameter settings while the performance of the prior art static scheme varies significantly with different parameter settings. It is to be noted that the trends for percentage of bytes and/or percentage of packets are similar and thus percentage of bytes may be chosen as the performance measure in some cases.

FIG. 5 further demonstrate the robustness of the SDDTS, in accordance with the present invention, as the two system limits, Limit(shortcut) and Limit(setup) are be increased to, for example, Limit(300,100). Thus, the maximum number of shortcuts may be 300, and maximum setup rate being 100 shortcuts per second. Increasing the system limits has the same effect as reducing the traffic intensity, which may be difficult to obtain with real traffic traces, while keeping the system limitations unchanged. FIG. 5 illustrates consistent near-optimal performance, using the same trace 0 but increasing the system limits as discussed above, utilizing SDDTS while the static scheme still heavily depends on the settings of the Onset_Trigger and the Abatement_Period.

FIG. 6 illustrates the dynamic characteristics of the present SDDTS, in accordance with the present invention, by using different traffic traces while keeping the system limits unchanged at Limit(150,20). FIG. 6 illustrates the SDDTS versus the prior art static scheme with Limit(150, 20) and Trace 1. With traffic trace 1, FIG. 6 shows consistent near-optimal performance of SDDTS while the static scheme still heavily depends on the parameter settings. Simulations using other traffic traces 2–6 (not shown) exhibit similar results.

Comparing the FIG. 4 with FIG. 6 with respect to the prior art static scheme indicates two very different trends with varying parameter settings. In FIG. 5, with 0, the percentage of bytes on shortcuts increases, in most cases, as the Abatement_Period increases from 10 to 60 seconds with Onset Trigger unchanged at 5, 10, 15, or 20. Meanwhile, with Abatement_Period unchanged, the percentage of bytes on shortcuts decreases as Onset Trigger increases. However, the trend in FIG. 6 is just the opposite of the trend shown in FIG. 4 and discussed above. In FIG. 6 with trace 1, the percentage of bytes on shortcuts decreases as Abatement_Period increases in most cases with Onset Trigger unchanged at 5, 10, 15, or 20. Meanwhile, with Abatement Period unchanged, the percentage of bytes on shortcuts increases as Onset Trigger increases in most cases. This comparison further indicates that it is impossible to select appropriate static parameter settings without knowing the traffic characteristics and intensity with respect to the system limits. Thus, static settings may not efficiently route data traffic onto shortcuts as may be possible, utilizing embodiments of the present invention. An adaptive scheme, in accordance with embodiments of the present invention, may dynamically adjust control parameters to achieve high switching efficiency.

Figure 7:
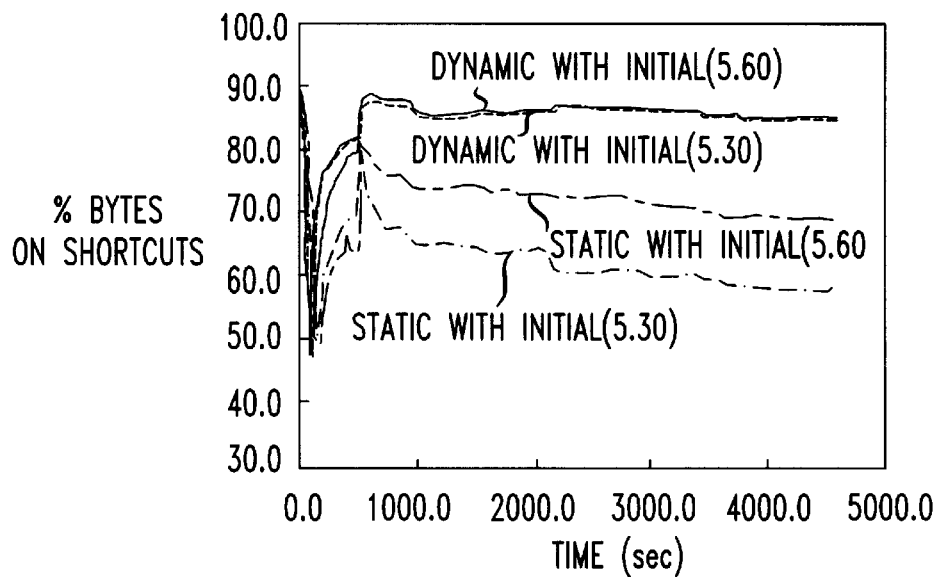

FIG. 7 illustrates the transient behaviors of both SDDTS and the static scheme using trace 1 with Limit(150,20). The transient behaviors are studied with fixed parameter values over a specified period of time over varying traffic conditions. For example, the initial parameter values at Initial(5, 30) and Initial(5,60) which result in medium to worst performance for the static scheme as shown in FIG. 6 are utilized to determine transient behavior over a period of time. Thus, the simulation results of the transient behaviors of SDDTS vs. the prior art static scheme are shown in FIG. 7. Utilizing SDDTS, in accordance with embodiments of the present invention, the percentage of bytes on shortcuts, with both initial settings Initial(5,30) and Initial(5,60), fluctuates at first and may converges to the range within 5% of the final stabilized value around 400 seconds after the simulation started. On the other hand with the prior art static scheme, the percentage of bytes on shortcuts fluctuates at first, and then starting around 900 seconds, the percentage of bytes on shortcuts tends to decrease slowly throughout the simulation lifetime from 74.3% to 68.8% for Initial(5,30 ) and from 68.0% to 57.7% for Initial(5,60). Compared with the static scheme, SDDTS, in accordance with embodiments of the present invention, adapts to the traffic dynamics much faster and in a much more robust manner while achieving consistently high switching efficiency.

Next, the impacts of various parameters on the performance of SDDTS will be examined. These parameters may include, for example, the damping factor, Update_Period, and upper and lower thresholds on number of shortcuts and shortcut setup rates. Since the onset criterion is mainly controlled by Onset Trigger, i.e., a new shortcut will be set up once the Onset Trigger is reached within an Onset Period, the performance is relatively insensitive to the value of Onset Period.

Figure 8:
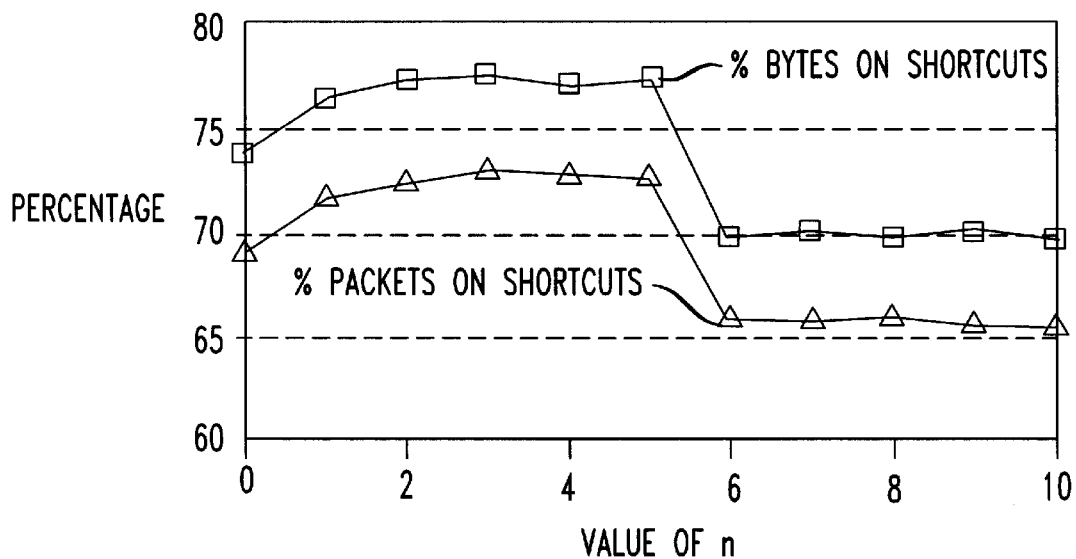

The following discusses the sensitivity of the damping factor in embodiments of the present invention. The damping factor may be defined as $\alpha=2^{-n}$, n=0, 1, 2, 3, ... Trace 0 is used with Limit(150,20), Update_Period=1, and Initial (20,60). FIG. 8 illustrates the percentage of bytes/packets on shortcuts with varying $\alpha$, damping factor, with n ranging from 0 to 10. FIG. 8 shows that while n is some reasonably small positive value, for example, 1 to 5, the performance of SDDTS is relatively robust. When n=0 which is the case where there is no damping factor applied, the average value becomes the instantaneous value which can change rapidly and causes performance degrading. Where n becomes too large, for example, n>5, the damping factor $\alpha$ becomes extremely small so that it takes much longer time for the average value to reflect the actual changes. In an adaptive system, the effect of the dynamic scheme may be significantly reduced where n is increased and consequently $\alpha$ becomes smaller. Thus, in embodiments of the present invention, it may be advantageous to preset the damping factor $\alpha$ at a value where n is equal to 3.

Figure 9:
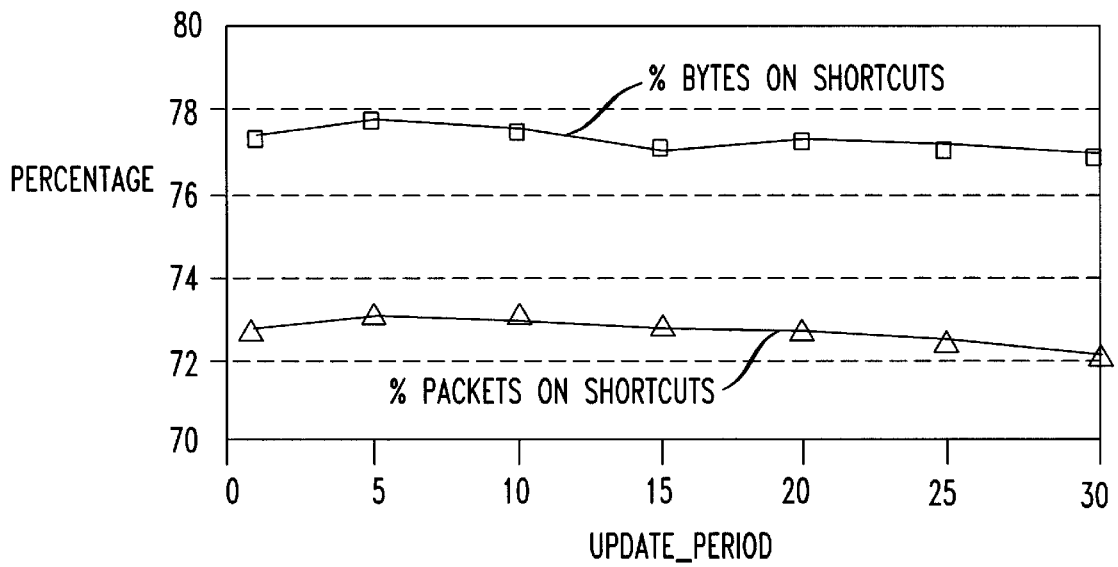

The following discusses the sensitivity of the update period in embodiments of the present invention. FIG. 9 illustrates the effect of a variable Update_Period in SDDTS system. FIG. 9 shows that in steady state the percentage of packets/bytes on shortcuts is relatively insensitive to Update_Period. As stated above, the Update Period may determine how often $N(shortcut)_{avg}$ is updated, which may result in an update of, for example, the Onset_Trigger according to the algorithm. In the simulation as shown in FIG. 9, the trace 0 and parameters of FIG. 8 have been utilized. In this simulation, to demonstrate the advantage of embodiments of the present invention, n is set to 3 and the Update_Period may vary from, for example, 1 to 30.

FIG. 9 illustrates that under steady state conditions, the packets/bytes being routed via shortcuts may be relatively insensitive to, for example, the update period. Switch performance may reach near-optimal levels as a result of dynamically adjusting the two triggering parameters according to the two updated state variables. However, the transient behavior may be somewhat sensitive to Update_Period. With larger Update_Period, it takes longer to reach its stabilized performance level. For example, with Update_Period1 it takes only 330 seconds to reach a level that is within 10% of its final level while with Update_Period=30 it takes 530 seconds to reach a level that is within 10% of its final level. In general, if the system permits, Update_Period should be chosen to be as small as the system permits.

The following discusses the sensitivity to thresholds in embodiments of the present invention. The lower and upper thresholds of number of shortcuts and setup rate on the performance of SDDTS, may be understood by examining at least two parameters to characterize the thresholds. These two parameters may include, for example, Mid_threshold and Dist. Mid_threshold may be denoted as the mid-point between lower and upper thresholds with respect to the maximum allowed value. The Dist may be denoted as the distance or difference between lower and upper thresholds with respect to the maximum allowed value. Given a pair of Mid threshold and Dist, the thresholds may be determined as follows:

$Thr(shortcut)^{lower}=\max\{Mid\_threshold\_Dist/2, 0\}*L(shortcut)$, $Thr(shortcut)^{upper}=\min\{Mid\_threshold+Dist/2, 1\}*L(shortcut)$, $Thr(setup)^{lower}=\max\{Mid\_threshold\_Dist/2, 0\}*L(setup)$, $Thr(setup)^{upper}=\min\{Mid\_threshold+Dist/2, 1\}*L(setup)$.

Figure 10:
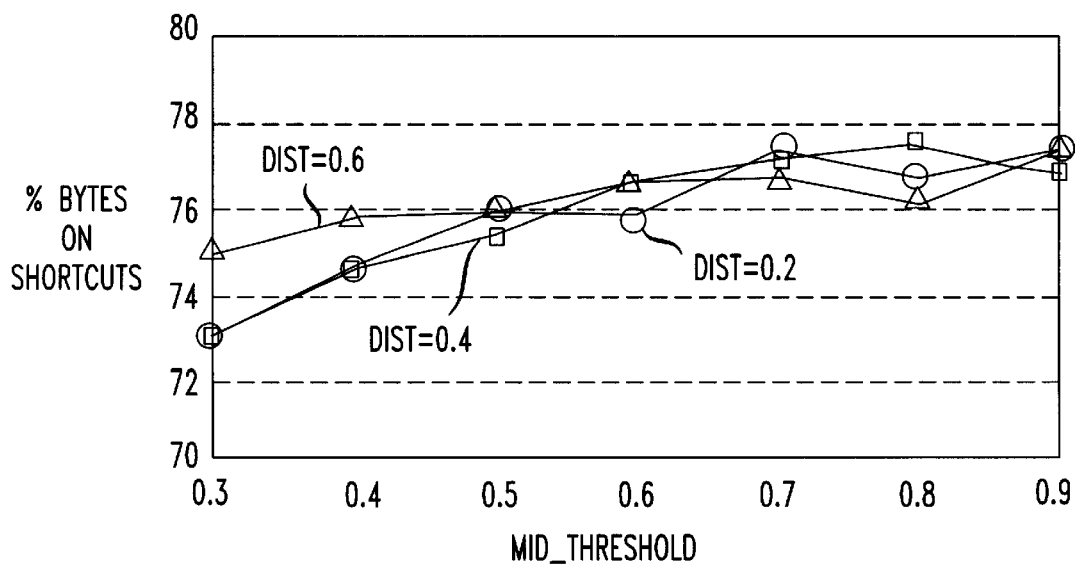

FIG. 10 illustrates the simulation results with respect to the various threshold levels. The simulation of FIG. 10 uses the same trace 0 and parameters as utilized in the simulations of FIGS. 8 and 9, except that the thresholds may vary according to the corresponding Mid threshold and Dist. The results of FIG. 10 indicate that the percentage of bytes on shortcuts are, in general, on the near optimal level except for the cases where both Mid threshold and Dist are low. For example where Mid threshold equals 0.3 and Dist equals 0.2 or 0.4, this result in relatively small values of upper and lower thresholds. Accordingly, when the values of upper and lower thresholds are too small, the algorithm forces the system to operate in some under-utilized state. Thus, it may be desirable, in some embodiments of the present invention, to set the lower and upper thresholds to be between 0.6 and 0.8 or 60–80% of the maximum allowed value.

The present invention discloses a system and method for implementing a new dynamic scheme called SDDTS for triggering QoS shortcut setup and tearing down for optimal router efficiency. According to system states in terms of average number of simultaneous shortcuts and average setup rate, the algorithm, in accordance with embodiments of the present invention, dynamically adjusts the two triggering parameters, for example, onset trigger and abatement period. Simulation results discussed above and illustrated in FIGS. 4–10 indicate the various advantages of the dynamic system for efficiently routing QoS data traffic flows disclosed herein. It should be noted that regardless of initial parameter settings, SDDTS, in accordance with the present invention yields consistently higher switching efficiency than the prior art static scheme.

Although several preferred embodiments of this invention have been described in detailed therein with reference to the accompanying drawings, it is to be understood that the invention is not limited to these illustrative embodiments, and that the various changes and modifications may be affected therein by one skilled in the art without departing from the true spirit and fill scope of the invention as defined in the appended claims.

We claim:

1. A method of controlling Internet data packet processing, comprising the steps of:
   receiving a data packet at a router;
   determining whether a shortcut has been set up for a data flow to which said packet belongs, said shortcut comprising a directed forwarding path having an associated label
   checking the status of an onset trigger counter when no shortcut exists; and
   when a current value of said onset trigger counter exceeds an onset trigger value, setting up a new shortcut for said data packet belonging to said data flow.

2. The method of claim 1, said onset trigger value is dynamically determined based on a relative position of a current state to a stable state.

3. The method as in claim 2, said onset trigger value being periodically updated to move towards said stable state.

4. The method of claim 1, further comprising the step of:
   tearing down an existing shortcut, when no data packet belonging to said data flow has arrived at said router by the end of an abatement period.

5. The method of claim 4, said abatement period is dynamically determined based on a relative position of a current state to a stable state.

6. The method as in claim 5, said abatement period is periodically updated to move towards said stable state.

7. The method as in claim 5, said abatement period is updated at the end of a previous abatement period.

8. The method of claim 5, said abatement period is dynamically adjusted based on at least one of incoming data traffic patterns and router limitations.

9. The method according to claim 1, said onset trigger counter for counting a number of said packets belonging to said data flow that are received by said router.

10. The method according to claim 9, said current value of said onset trigger counter being periodically set to zero when the number of data packets belonging to said flow received during an onset period is less than said onset trigger value.

11. The method according to claim 10, said onset period is predetermined.

12. A method of dynamically processing quality of service shortcut setup and tearing down in a router, the method comprising the step of:

dynamically determining an appropriate number of shortcuts simultaneously permitted by said router for optimum switching efficiency through said router, a shortcut being a directed forwarding path having an associated label, said step of dynamically determining an appropriate number of said shortcuts further comprising the steps of counting a number of data packets associated with a data flow received by said router via an onset trigger counter and dynamically adjusting an onset trigger value for triggering the creation of new shortcuts.

13. The method according to claim 12, wherein said step of dynamically determining an appropriate number of said shortcuts further comprises:

determining whether data packets associated with said data flow are received by said router by the end of an abatement period;

when no said data packets associated with said data flow are received by the end of said abatement period, tearing down an existing shortcut associated with said data flow for the creation of said new shortcuts; and dynamically adjusting said abatement period for achieving said optimum switching efficiency through said router.

14. The method of claim 13, wherein a new abatement period is started at the end of said abatement period.

15. A router for switching data, comprising:

an input means for receiving a data flow comprising a plurality of associated data packets;

a clock for measuring a dynamically established abatement period;

a controller for determining whether a shortcut for said data flow to which said plurality of data packets belong has been set up, when no said shortcut exists, said controller for further setting up a new shortcut for routing said plurality of data packets belonging to said data flow;

said controller further comprising an onset trigger counter for counting said plurality of data packets received by said input means, when said count on said onset trigger counter exceeds a dynamically established onset trigger value, said controller establishes said new shortcut for routing said plurality of data packets belonging to said data flow; and said controller responsive to said dynamically established abatement period measured by said clock for tearing down an existing shortcut when no data packet belonging to said flow is received by the end of said dynamically established abatement period.

16. The router of claim 15, said dynamically established onset trigger value is based on a relative position of a current state to a stable state.

17. The router of claim 16, said dynamically established onset trigger value is adjusted based at least on one of incoming data traffic patterns and router limitations.

18. The router of claim 15, said dynamically established abatement period is based on a relative position of current state to a stable state.

19. The router of claim 18, said dynamically established abatement period is adjusted base d on at least one of incoming data traffic patterns and router limitations.

20. The router of claim 15, said dynamically established onset trigger value and said abatement period being functions of resource limitations and variable traffic characteristics of said router.

21. A router for switching quality of service data packets, comprising:

an input means for receiving a data flow comprising a plurality of associated data packets;

a clock means for measuring a dynamically established abatement period;

a controller means for routing said plurality of data packets associated with said data flow to one of a default route, an existing shortcut dedicated for said data flow or a new shortcut;

said controller means for setting up said new shortcut for routing said plurality of data packets of said data flow when no said shortcut exists;

said controller further comprising an onset trigger counter for counting said plurality of data packets received by said input means, when said count on said onset trigger counter exceeds a dynamically established onset trigger value, said controller establishes said new shortcut for routing said plurality of data packets of said data flow; and said controller responsive to said dynamically established abatement period measured by said clock for tearing down said existing shortcut when no data packet of said flow is received by the end of said abatement period.

22. The router of claim 21, said controller for determining whether said plurality of data packets are associated with said existing shortcut and when said plurality of data packets are associated with said existing shortcut, routing said plurality of said data packets via said existing shortcut.

23. The router of claim 21, when said count on said onset trigger counter is less than said dynamically established onset trigger value, said controller for forwarding said plurality of data packets of said data flow via said default route.

* * * * *